United States Patent
Adamin et al.

(10) Patent No.: US 8,798,822 B2
(45) Date of Patent: Aug. 5, 2014

(54) ELECTRICAL JUNCTION BOX FOR A RAILWAY VEHICLE

(71) Applicant: Bombardier Transportation GmbH, Berlin (DE)

(72) Inventors: Lech Adamin, Amherstview (CA); Daniel Joyce, Amherstview (CA); Mohamed Youssef, Kingston (CA)

(73) Assignee: Bombardier Transportation GmbH, Berlin (DE)

( * ) Notice: Subject to any disclaimer, the term of this patent is extended or adjusted under 35 U.S.C. 154(b) by 19 days.

(21) Appl. No.: 13/714,551

(22) Filed: Dec. 14, 2012

(65) Prior Publication Data

US 2013/0158753 A1    Jun. 20, 2013

Related U.S. Application Data

(60) Provisional application No. 61/576,196, filed on Dec. 15, 2011.

(51) Int. Cl.
*B60L 9/00* (2006.01)
*B60L 3/00* (2006.01)

(52) U.S. Cl.
CPC ... *B60L 9/00* (2013.01); *B60L 3/00* (2013.01); *B60L 3/0069* (2013.01); *B60L 2200/26* (2013.01); *Y02T 90/16* (2013.01)
USPC .............. 701/19; 174/50; 439/76.1; 220/3.2

(58) Field of Classification Search
CPC .......... B60L 9/00; B60L 3/00; B60L 3/0069; B60L 2200/26
USPC .............. 701/19; 174/50; 439/76.1; 220/3.2
See application file for complete search history.

(56) References Cited

U.S. PATENT DOCUMENTS

2010/0319951 A1 * 12/2010 Nakayama et al. ............. 174/50

* cited by examiner

*Primary Examiner* — Mary Cheung
*Assistant Examiner* — Brian P Sweeney (57) ABSTRACT

An onboard electrical junction box. The onboard electrical junction box comprises an auto-change-over switch adapted to acquire: a first state wherein power is supplied to the electrical system from a power rail via at least one onboard power collector device; and a second state wherein power is supplied to the electrical system from a removable shore power source, wherein during operation in the second state, the at least one onboard power collector device is isolated from the power supplied by the removable shore power source. The onboard electrical junction box also comprises a switch control module in electrical communication with the auto-change-over switch for causing the auto-change-over switch to acquire the second state upon detection that: the removable shore power source has established an electrical connection with the onboard electrical junction box; and the electrical system of the vehicle is receiving power below a predetermined threshold.

20 Claims, 7 Drawing Sheets

ELECTRICAL JUNCTION BOX FOR A RAILWAY VEHICLE

CROSS-REFERENCE TO RELATED APPLICATIONS

This application claims priority to U.S. Provisional Application No. 61/576,196, which was filed on Dec. 15, 2011, the contents of which are incorporated herein by reference in their entirety.

FIELD OF THE INVENTION

The present invention relates to the field of electrical powered railway vehicles, and more particularly to electrical junction boxes for electrical railway vehicles that are operative for isolating power to an onboard power collector device when the railway vehicle is connected to a removable shore power source in the maintenance facility.

BACKGROUND OF THE INVENTION

Figure 1:
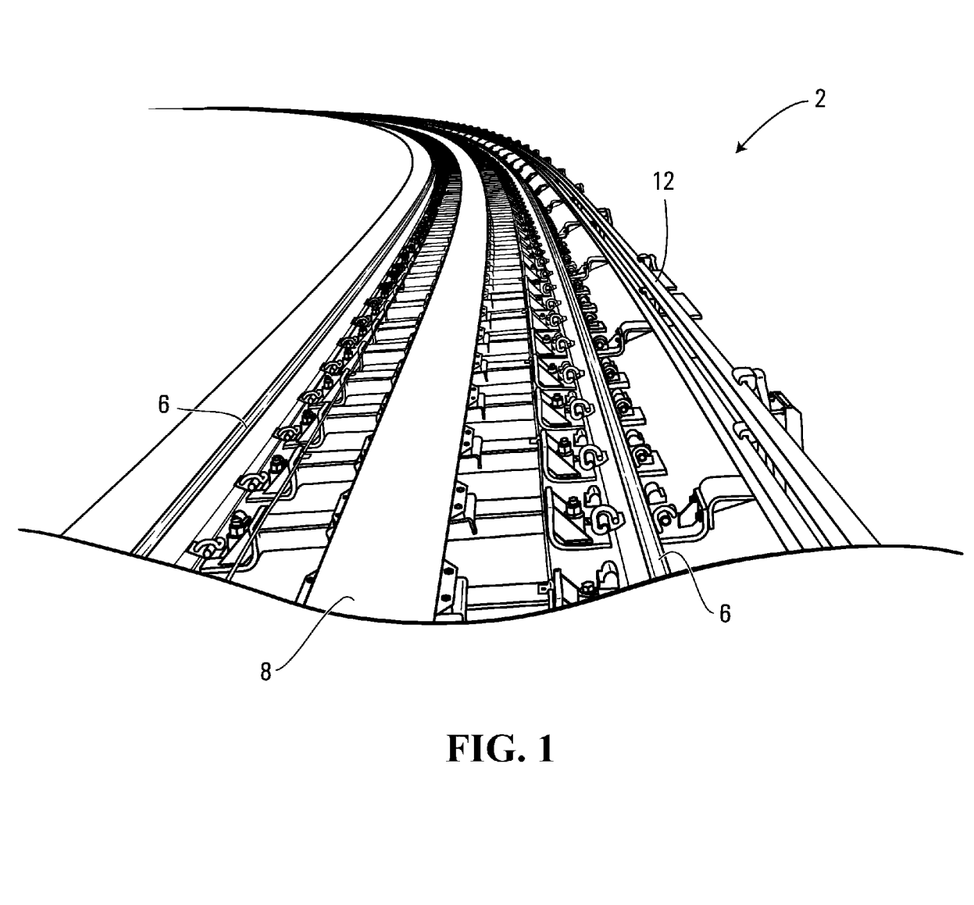
FIG. 1 shows a non-limiting example of a railway track comprising a power-rail assembly for providing power to an electric railway vehicle during travel over the railway track.

Many electric railway vehicles receive power from a track-based power system as they travel over a railway track. Shown in FIG. 1 is a non-limiting example of a monorail railway track 2 that comprises two running rails 6 and a LIM reaction rail 8. Included on the right side of the railway track 2 is a power rail 12 for providing power to a railway vehicle that travels over the railway track 2.

In order to receive power from the power rail 12 during travel over the railway track 2, the railway vehicle includes at least one onboard power collector device that is able to interface with the power rail 12 for receiving power. The power that is received from the onboard power collector devices enters an onboard electrical junction box, which then supplies the power to one or more electrical systems of the railway vehicle.

When a railway vehicle enters a maintenance area or storage area, the power rail 12 that is located along the track is no longer available to supply power to the railway vehicle. As such, most maintenance areas comprise a local shore power source (generally in the form of a cable called a "stinger") that can be connected to the railway vehicle for providing power to the railway vehicle during maintenance or diagnostic procedures.

A deficiency with existing railway vehicles is that the onboard power collector devices that receive power from the power rail 12 are exposed to the environment when in the maintenance area. As such, when the local shore power source is connected to the railway vehicle, these onboard power collector devices present live exposed ends of a power source. This is very dangerous for workers within the maintenance area, who may accidentally come into contact with the exposed power collector devices and suffer from electrical shock. In some circumstances, when the railway vehicle is in the maintenance area, covers are placed over the power collector device that include warning signs thereon, in order to help maintenance workers from coming into contact with their exposed surfaces. However, despite this precaution, it has been found that accidents still happen and workers sometimes are badly hurt by high-voltage electrical shocks.

In light of the above, it can be seen that there is a need in the industry for an improved railway vehicle power supply system that has improved safety so as to improve on the overall operation of the electrical powered railway vehicles.

SUMMARY OF THE INVENTION

In accordance with a first broad aspect, the present invention provides an onboard electrical junction box for supplying power to an electrical system of a vehicle. The onboard electrical junction box comprises an auto-change-over switch adapted to acquire: a first state wherein power is supplied to the electrical system from a power rail via at least one onboard power collector device; and a second state wherein power is supplied to the electrical system from a removable shore power source, wherein during operation in the second state, the at least one onboard power collector device is isolated from the power supplied by the removable shore power source. The onboard electrical junction box also comprises a switch control module in electrical communication with the auto-change-over switch for causing the auto-change-over switch to acquire the second state upon detection that: the removable shore power source has established an electrical connection with the onboard electrical junction box; and the electrical system of the vehicle is receiving power below a predetermined threshold.

In accordance with a second broad aspect, the present invention provides a method for supplying power to an electrical system of a railway vehicle through an onboard electrical junction box. The onboard electrical junction box is capable of supplying power to the electrical system of the railway vehicle from a power rail via at least one onboard power collector device, and from a removable shore power source. The method comprises detecting when: an electrical connection between the removable shore power source and the onboard electrical junction box has been established; and the electrical system of the vehicle is not receiving power from either the at least one onboard power collector device or the removable shore power source. The method also comprises, upon detection of items (1) and (2): causing power from the removable shore power source to be supplied to the electrical system of the vehicle; and causing the power from the removable shore power source to be isolated from the at least one onboard power collector device.

In accordance with a third broad aspect, the present invention provides a system for providing power to an electrical system of a railway vehicle. The system comprises at least one onboard power collector device for collecting power from a power rail. The system also comprises an onboard electrical junction box in electrical communication with the at least one onboard power collector device. The onboard electrical junction box comprises an auto-change-over switch adapted to acquire: a first state wherein power is supplied to the electrical system from the power rail via the at least one onboard power collector device; and a second state wherein power is supplied to the electrical system from a removable shore power source, wherein during operation in the second state, the at least one onboard power collector device is isolated from the power supplied by the removable shore power source. The onboard electrical junction box also comprises a switch control module in electrical communication with the auto-change-over switch for causing the auto change-over switch to acquire the second state upon detection that: the removable shore power source has established an electrical connection with the onboard electrical junction box; and the electrical system of the vehicle is receiving power below a predetermined threshold.

These and other aspects and features of the present invention will now become apparent to those of ordinary skill in the art upon review of the following description of specific embodiments of the invention and the accompanying drawings.

Other aspects and features of the present invention will become apparent to those ordinarily skilled in the art upon review of the following description of specific embodiments of the invention in conjunction with the accompanying figures.

DETAILED DESCRIPTION OF THE EMBODIMENTS

Figure 2:
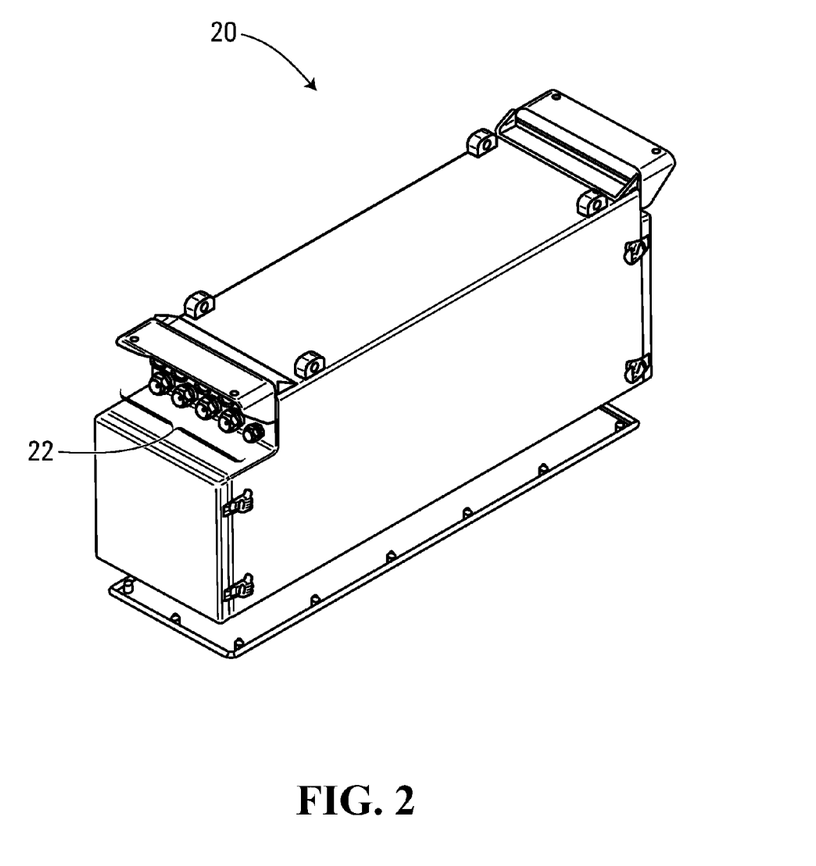
FIG. 2 shows an isometric view of an electrical junction box in accordance with a non-limiting example of implementation of the present invention.

Shown in FIG. 2 is a non-limiting isometric view of an onboard electrical junction box 20 according to the present invention. The electrical junction box 20 is located onboard a railway vehicle 24 and is operative for supplying power to one or more electrical systems 26 of the railway vehicle 24, such as the vehicle's auxiliary power unit (APU) 28 and the vehicle's propulsion control system (PCS) 30, among other possibilities.

When the railway vehicle 24 is traveling over a railway track, the electrical junction box 20 is operative for receiving power from a track-based power rail (such as the power rail 12 shown in FIG. 1) via at least one onboard power collector device 36 (sometimes referred to as a "collector shoe"). Then, when the railway vehicle 24 is within a maintenance area, the electrical junction box 20 is operative for receiving power from a removable shore power source 32 (sometimes referred to as a "stinger") that is located within the maintenance area. As shown, the electrical junction box 20 comprises connector elements 22 (as shown in FIG. 2) for connecting the electrical junction box 20 to the electrical systems of the railway vehicle 24, as well as to the power collector device 36 and the removable shore power source 32. Through these connections, the electrical junction box 20 is able to receive power from a power source (either the track-based power rail 12 or the removable shore power source 32), and supply that power to at least one electrical system of the railway vehicle 24.

As will be described in more detail below, when the railway vehicle 24 is moved into a maintenance area, the electrical junction box 20 is operative for automatically detecting that the removable shore power source 32 has been connected to the onboard electrical junction box 20, and under the right circumstances, is able to supply power from the removable shore power source 32 to at least one electrical system of the railway vehicle 24, while simultaneously isolating the onboard power collector device 36 from the removable shore power source 32. As such, when the railway vehicle 24 is in the maintenance area, the onboard power collector device 36 does not present a live electrical surface that can be a safety hazard to the maintenance workers.

Figure 3:
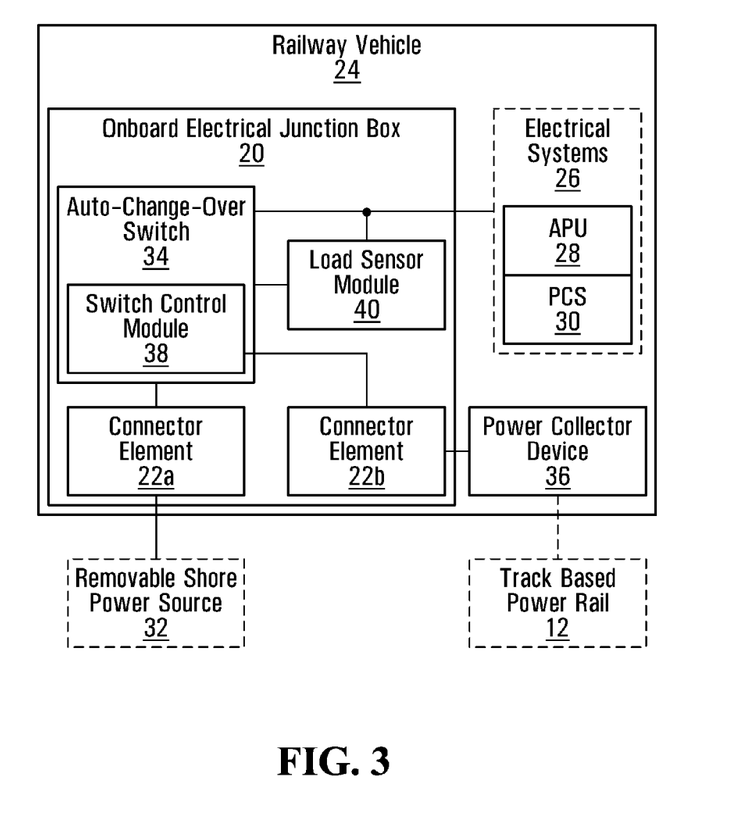
FIG. 3 shows a non-limiting functional block diagram of a railway vehicle comprising the electrical junction box of FIG. 2.

Shown in FIG. 3 is a non-limiting functional block diagram of a railway vehicle 24 comprising the onboard electrical junction box 20 as described above. The railway vehicle 24 may be any type of railway vehicle that is capable of receiving electrical power. For example, the railway vehicle 24 may be an electrical monorail vehicle, an automatic people mover (APM), such as at an airport, or an electrical sub-way vehicle, among other possibilities.

As shown, the railway vehicle 24 comprises electrical systems 26 that provide electricity to the various components of the railway vehicle 24 for allowing the railway vehicle 24 to operate. In the non-limiting block diagram shown, the railway vehicle 24 comprises two electrical systems 26; namely an APU 28 and a PCS 30. Although only two electrical systems 26 are shown, it should be appreciated that the railway vehicle 24 may comprise any number of different electrical systems that require power from a power source. The onboard electrical junction box 20 is in communication with the electrical systems 26 for supplying power thereto. In accordance with a non-limiting embodiment, the onboard electrical junction box 20 is a high voltage junction box that is able to supply 750V to the electrical systems 26. For the purposes of the present description, the onboard electrical junction box 20 will be described as supplying power to the electrical systems 26 (namely the APU 28 and the PCS 30). However, it should be understood that the onboard electrical junction box 20 may supply power to only one electrical system (such as the APU 28, for example), or the onboard electrical junction box 20 may supply power to any number of the electrical systems in the case where the railway vehicle 24 comprises multiple different electrical systems 26.

In order to be able to supply power to the electrical systems 26, the onboard electrical junction box 20 is capable of receiving power from two different electrical power sources; namely from the track based power rail 12 via an onboard power collector device 36, and from the removable shore power source 32. As described above, the onboard electrical junction box 20 typically receives power from the track-based power rail 12 when the railway vehicle 24 is travelling over the railway track, and typically receives power from the removable shore power source 32 when the railway vehicle 24 is within a maintenance area. In general, each of these power sources is in electrical communication with the onboard electrical junction box 20 at different times. However, it is possible that the removable shore power source 32 could be connected to the onboard electrical junction box 20 while the onboard electrical junction box 20 is still receiving power from the track based power rail 12. As such, the onboard electrical junction box 20 according to the present invention is equipped with safety mechanisms and functionality to avoid accidents that can arise from receiving power from two different power sources at the same time. This will be described in more detail below.

As shown in FIG. 3, the onboard electrical junction box 20 comprises connector element 22a to which the removable shore power source 32 can be connected, and connector element 22b to which the onboard power collector device 36 is connected. The onboard power collector device 36 generally stays connected to the onboard electrical junction box 20 at all times, even when the removable shore power source 32 is connected. Although only one power collector device 36 is shown in the block diagram of FIG. 3, it is to be understood that the railway vehicle 24 may comprise two or more power collector devices 36, which would all be in electrical communication with the onboard electrical junction box 20. Furthermore, in accordance with a non-limiting embodiment, the onboard power collector device 36 is a current collector device.

The onboard electrical junction box 20 further comprises an auto-change-over switch 34 that is in communication with both the connector elements 22*a* and 22*b*. The auto-change-over switch 34 is operative for switching between the track-based power rail 12 and the removable shore power source 32 for providing power to the electrical systems 26. More specifically, the auto-change-over switch 34 is operative for acquiring: (i) a first state wherein power is supplied to the electrical systems 26 from the track based power rail 12, via the onboard power collector device 36; and (ii) a second state, wherein the power is supplied to the electrical systems 26 from the removable shore power source 32.

Furthermore, when the auto-change-over switch 34 is in the second state, the auto-change-over switch 34 causes the power collector device 36 to be isolated from the power supplied by the removable shore power source 32. In this manner, when the railway vehicle 24 is in a maintenance area, and is being supplied with power from the removable shore power source 32 (such as a "stinger" cable), maintenance workers are not in danger of being electrically shocked by accidental contact with the onboard power collector device 36 (which could be a "collector shoe").

The switching of the auto-change-over switch 34 between the first state and the second state is controlled by a switch control module 38 at least in part on a basis of control signals received from the removable shore power source 32 when it is connected to the onboard electrical junction box 20 and a load sensor module 40 that is operative for detecting when an electrical load is being supplied to the electrical systems 26.

The functioning of the onboard electrical junction box 20, and specifically the auto-change-over switch 34, will now be described in more detail with respect to the schematic diagram of FIG. 4 and the flow diagrams of FIGS. 5 through 7.

Figure 4:
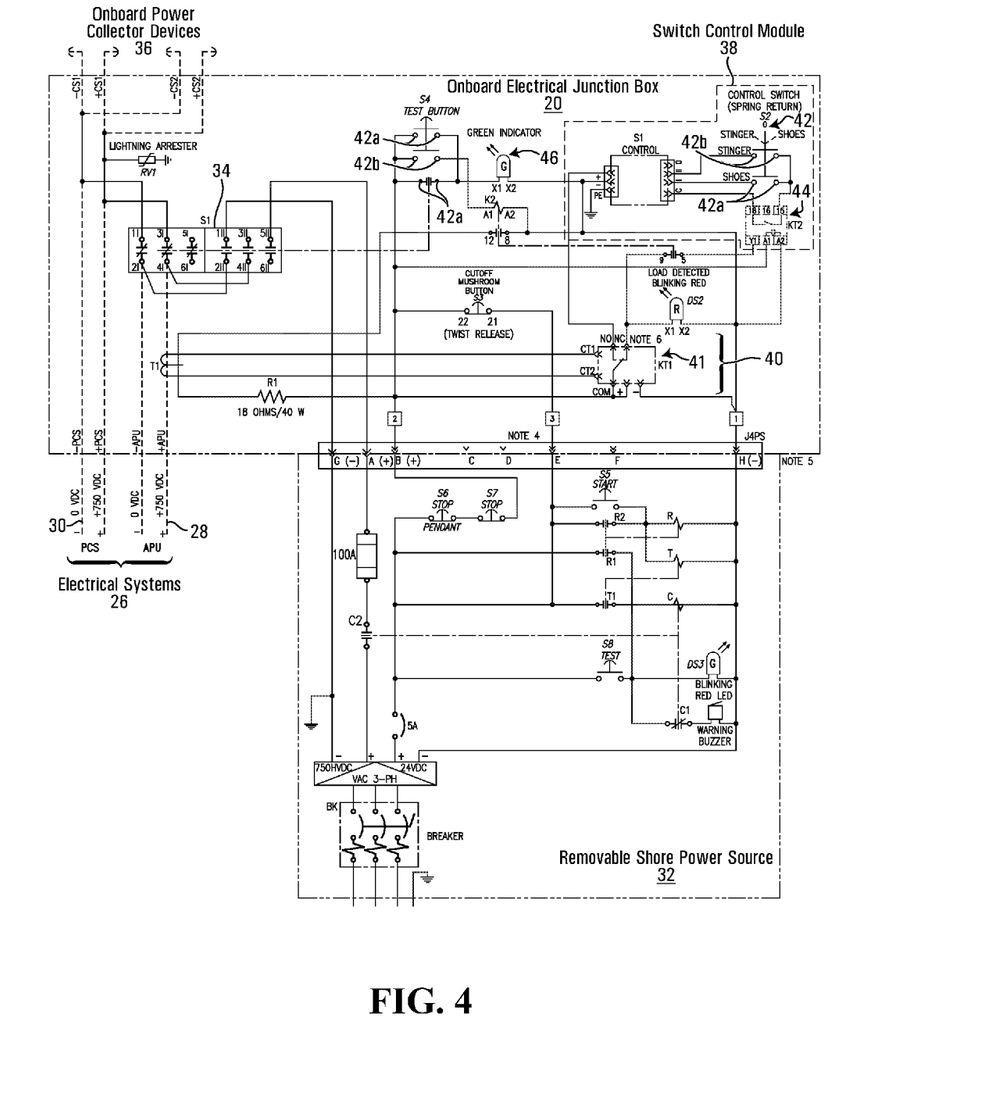
FIG. 4 shows a non-limiting schematic diagram of the functional elements of the electrical junction box of FIG. 2.

FIG. 4 shows a non-limiting schematic diagram of the onboard electrical junction box 20 with the removable shore power source 32 connected thereto. In the non-limiting embodiment shown, the auto-change-over switch 34 is a three pole motorized change-over switch. It should, however, be appreciated that other types of switches could also be used without departing from the present invention. The motorized change-over switch is able to change position (from the first state to the second state, or vice versa) based on detection at the switch control module 38 of certain circumstances, which will be discussed in more detail below with respect to specific examples. As shown, the switch control module 38 comprises a spring return three position control switch 42 that is able to switch between a power collector device position (represented by junction 42*a*-42*a*), a removable shore power source position (represented by junction 42*b*-42*b*) and a 0 position. Both the three pole motorized change-over switch and the spring return three position control switch 42 are solid state switches. In general, solid state switches are lighter, more reliable and less expensive than traditional electro-mechanical devices.

Switching from Receiving Power from the Onboard Power Collector Device 36 to Receiving Power from the Removable Shore Power Source 32

Let us now consider the functioning of the onboard electrical junction box 20 when the railway vehicle 24 moves into a maintenance area where there is no longer a track-based power rail 12. When the railway vehicle 24 enters the maintenance area, the auto-change-over switch 34 will be in the first state, wherein it allows power to be supplied to the electrical systems 26 (the APU 28 and PCS 30) from the track-based power rail 12, via the onboard power collector device 36. When the auto-change-over switch 34 is in the first state, the three poles 1I-2I, 3I-4I and 5I-6I are closed so that power can flow from the onboard power collector device 36 to the electrical systems 26 of the railway vehicle 24. Furthermore, the three poles 1II-2II, 3II-4II and 5II-6II are open so that no power from the removable shore power source 32 can get through to the electrical systems 26.

Typically, once the railway vehicle 24 is in the maintenance area, a certain amount of time (such as 15 minutes, for example) is allowed to elapse before the removable shore power source 32 is connected to the onboard electrical junction box 20. This time allows the electrical load that was being received from the onboard power collector device 36 to discharge, such that the auto-change-over switch 34 is not caused to change position while the electrical systems 26 of the railway vehicle 24 are under load.

As shown, the onboard electrical junction box 20 comprises the load sensor module 40 that is able to detect whether the electrical systems 26 are under electrical load. In accordance with a non-limiting embodiment, the load sensor module 40 is a current sensor module 41 that detects when the current flowing to the electrical systems 26 is below a certain threshold. However, in an alternative embodiment, the load sensor module 40 could also be a voltage sensor module. Any device capable of detecting when load is being supplied to the electrical systems 26 is included within the scope of the present invention.

The purpose of the load sensor module 40 (which in the embodiment shown in FIG. 4 is the current sensor module 41), is to ensure that the auto-change-over switch 34 is unable to change position (i.e., from the first state to the second state, or vice versa) when the vehicle's electrical systems 26 are under load. As such, until the current sensor module 41 has detected that the current being supplied to the electrical systems 26 is below a certain threshold (such as 1 A, for example), the auto-change-over switch 34 is prevented from changing position.

Once the designated time period (such as 15 minutes) has elapsed, such that the power to the electrical systems 26 has presumably discharged, the removable shore power source 32 can then be connected to the onboard electrical junction box 20. FIG. 4 shows the removable shore power source 32 connected to the onboard electrical junction box 20.

In order for the switch control module 38 to cause the auto-change-over switch 34 to change position such that power is supplied to the electrical systems 26 via the removable shore power source 32, two things must be detected. Firstly, it must be detected that the electrical load being supplied to the electrical systems 26 is below a certain threshold, such that the auto-change-over switch 34 does not change position while the electrical systems 26 are under load. And secondly, it must be detected that the removable shore power source 32 is in electrical connection with the onboard electrical junction box 20. These two conditions will be described in more detail below with respect to the flow chart shown in FIG. 5.

Figure 5:
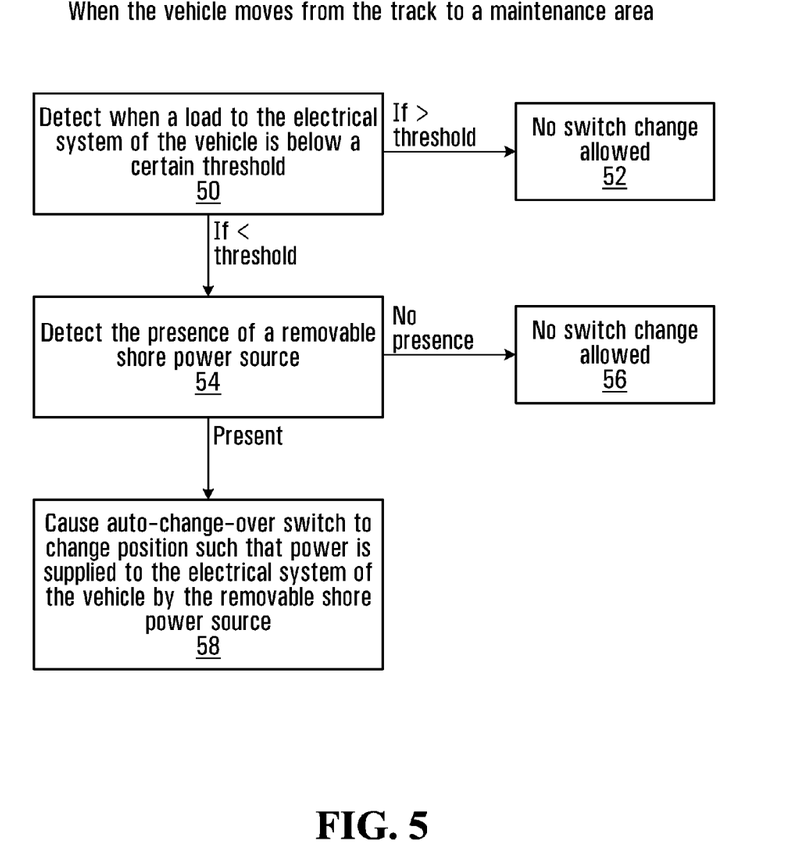
FIG. 5 shows a first non-limiting flow diagram of an operation performed by a switch control module according to the present invention.

More specifically, FIG. 5 shows a flow diagram of the process that occurs at the switch control module 38 in order to cause the auto-change-over switch 34 to switch from the first state to the second state. At step 50, the switch control module 38 needs to detect whether the load being supplied to the vehicle's electrical systems 26 is below a certain threshold. As mentioned above, if the load is not below the certain threshold, then the auto-change-over switch 34 will be prevented from changing position for safety reasons. This is represented by box 52 of FIG. 5.

Referring back to FIG. 4, the detection of whether a load on the electrical systems 26 is below a certain threshold is performed on a basis of a signal from the current sensor module

41. When the current sensor module 41 detects that the current being supplied to the electrical systems 26 is below a certain threshold (such as 1 A), then it moves from the normally open position (NO) to the closed position (NC), as shown. When the current sensor module 41 is in the closed position, a signal is able to pass to the switch control module 38, such that the switch control module 38 is able to detect that the load on the electrical systems 26 is below the certain threshold. However, when the current sensor module 41 is in the open position, it means that a load is being applied to the electrical systems 26, and no signal from the current sensor module 41 is received at the switch control module 38. In the absence of such a signal, the switch control module 38 is prevented from causing the auto-change-over switch 34 from changing position. Again, this is represented by box 52 of FIG. 5.

In accordance with a non-limiting embodiment, as shown in FIG. 4, when the load on the electrical systems 26 is below a certain threshold, the signal from the current sensor module 41 to the switch control module 38 is received at a time delay relay 44. The time delay relay 44 ensures that the load on the vehicle's electrical systems 26 has been below the certain threshold for at least a predetermined period of time (such as 120 seconds, for example) prior to enabling the switch control module 38 to allow the auto-change-over switch 34 to switch position. When the time delay relay 44 has detected that the signal from the current sensor module 41 has been received at the switch control module 38 for the predetermined period of time, then a relay KT2 is closed. By closing the relay, the switch control module 38 is no longer prevented from causing the auto change-over switch from changing position.

In addition to detecting that the load on the electrical systems 26 is below a certain threshold, in order to be able to cause the auto-change-over switch 34 to change from the first state to the second state, at step 54 of FIG. 5, the switch control module 38 needs to detect that the removable shore power source 32 has been connected to the onboard electrical junction box 20, and as such is available to supply power to the vehicle's electrical systems 26. In the embodiment shown in FIG. 4, the removable shore power source 32 has been connected to the onboard electrical junction box 20. The removable shore power source 32 comprises both a 24 VDC circuit and a 750 VDC circuit. The 750 VDC circuit is intended to provide high voltage power to the electrical systems 26 of the railway vehicle 24, and the 24 VDC circuit is a control circuit for enabling the switch control module 38 to detect when the removable shore power source 32 has been connected to the onboard electrical junction box 20.

More specifically, when the removable shore power source 32 has been connected to the onboard electrical junction box 20, a low voltage (24V) control signal from the 24 VDC circuit passes through connector pins B and H, and travels to the switch control module 38. Upon receipt of this 24V control signal, the switch control module detects that the removable shore power source 32 has been connected to the onboard electrical junction box 20. Upon this detection, the power collector device position 42a-42a of the control switch 42 is opened, and the removable shore power source position 42b-42b is closed. It should be appreciated that this movement of the control switch 42 is only possible when the current sensor module 41 has provided a signal indicative that the current applied to the electrical systems 26 of the railway vehicle 24 is below a certain threshold (meaning that no load is being applied to the railway vehicle 24). Otherwise, in the absence of such a signal from the current sensor module 41, the control switch 42 is prevented from being moved, regardless of whether the 24V control signal is received at the switch control module 38.

Furthermore, if the presence of the removable shore power source 32 is not detected by the switch control module 38, regardless of whether the load being supplied to the electrical systems 26 is below the certain threshold, the auto-change-over switch 34 will not be permitted to change position. This is represented by box 56 of FIG. 5.

Although in FIG. 5 step 50 is shown prior to step 54, it should be appreciated that these two steps could have been shown in the reverse order, with step 54 shown prior to step 50.

Assuming that the load to the electrical systems 26 of the railway vehicle 24 is below a certain threshold, and the switch control module 38 has detected that the removable shore power source 32 has been connected to the onboard electrical junction box 20, at step 58 shown in FIG. 5, the switch control module 38 causes the auto-change-over switch 34 to change position such that power is supplied to the electrical systems 26 of the railway vehicle 24 by the 750 VDC circuit of the removable shore power source 32. More specifically, upon closing of the removable shore power source position 42b-42b of the control switch 42, the auto-change-over switch 34 is automatically activated so as to change position to the second state. In addition, included within the onboard electrical junction box 20 is an indicator light 46 that is automatically illuminated upon closing of the removable shore power source position 42b-42b of the control switch 42, such that a visual indication is provided to an operator that the auto-change-over switch 34 is now in a position wherein power is being supplied to the electrical systems 26 via the removable shore power source 32.

When the auto-change-over switch 34 has switched to the second state, the three poles 1II-2II, 3II-4II and 5II-6II are closed so that power can flow from the removable shore power source 32 to the electrical systems 26 of the railway vehicle 24. Furthermore, the three poles 1I-2I, 3I-4I and 5I-6I are open so that no power from the removable shore power source 32 can get through to either the electrical systems 26, or to the onboard power collector devices 36. In this manner, by keeping poles 1I-2I, 3I-4I and 5I-6I open, the auto-change-over switch 34 isolates the power collector devices 36 from the power from the removable shore power source 32. This greatly reduces the risk of accidental injury to maintenance workers working on the railway vehicle 24 in the maintenance area.

Figure 7:
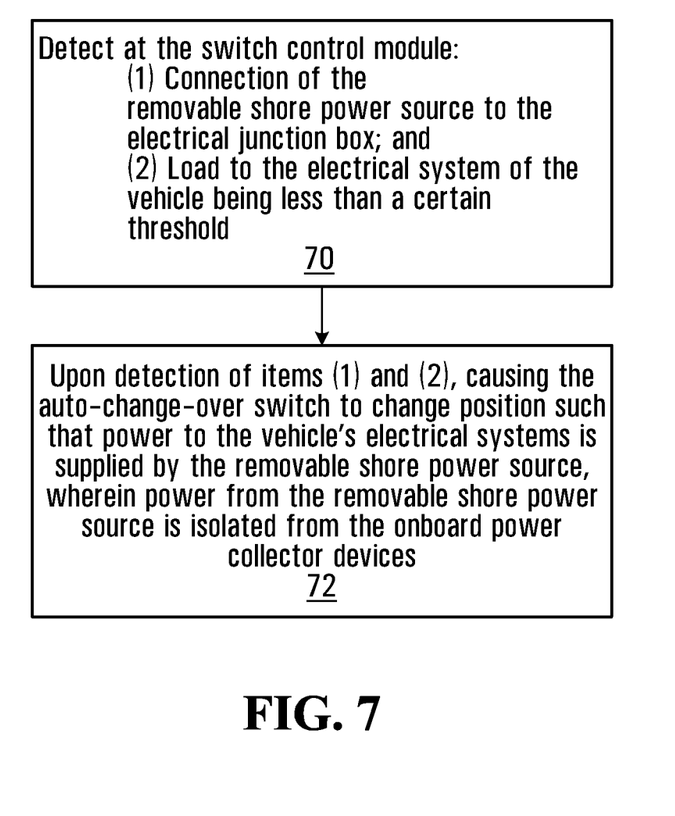
FIG. 7 shows a non-limiting flow diagram of a method executed by the switch control module according to the present invention.

Shown in FIG. 7 is a more general flow diagram of the process performed by the switch control module 38 in order to cause the auto-change-over switch 34 to automatically switch from the first state to the second state. As shown in step 70, the switch control module 38 detects when (1) the removable shore power source 32 has been connected to the onboard electrical junction box 20; and (2) when the load to the electrical systems 26 of the vehicle is less than a certain threshold. At step 72, upon detection of these two conditions, the switch control module 38 causes the auto-change-over switch 34 to change position such that power is supplied to the vehicle's electrical systems 26 via the removable shore power source 32, while simultaneously isolating the power received from the removable shore power source 32 from the onboard power collector devices 36.

In accordance with the present invention, the control switch 42 can also be manually operated in the case where the switch control module 38 fails to detect the 24V control signal (for example, in the case where there is lack of control power or faulty control circuitry). As such, in the case where the removable shore power source 32 is in electrical connection with the onboard electrical junction box 20, but has not been automatically detected by the switch control module 38, then the control switch 42 can be manually operated in order to close the removable shore power source position 42b-42b. Once the removable shore power source position 42b-42b has been closed (and assuming that the load on the electrical systems 26 has been detected to be below the certain threshold) the auto-change-over switch 34 will be caused to change position.

Although in the schematic diagram of FIG. 4, the switch control module 38 is shown located remotely from the auto-change-over switch 34, it should be understood that in practice, the switch control module 38 and the auto-change-over switch 34 are one entity with internal connections. As such, the activation of the auto-change-over switch 34 occurs automatically upon detection of the two criteria described above with respect to steps 50 and 54 of FIG. 5.

Switching from Receiving Power from the Removable Shore Power Source 32 Back to the Onboard Power Collector Devices 36

Let us now consider the functioning of the onboard electrical junction box 20 when the removable shore power source 32 is removed from connection with the onboard electrical junction box 20. Prior to disconnecting the removable shore power source 32 from the onboard electrical junction box 20, the auto-change-over switch 34 is in the second state, wherein the three poles 1II-2II, 3II-4II and 5II-6II are closed so that power can flow from the removable shore power source 32 to the electrical systems 26 of the railway vehicle 24. Furthermore, the three poles 1I-2I, 3I-4I and 5I-6I are open so that no power from the removable shore power source 32 can get through to the onboard power collector devices 36, thereby isolating the onboard power collector devices 36 from the power from the removable shore power source 32.

The process that occurs at the switch control module 38 in order to cause the auto-change-over switch 34 to switch from the second state back to the first state will now be described in more detail with respect to the flow chart of FIG. 6.

Once the removable shore power source 32 has been removed from connection to the onboard electrical junction box 20, the switch control module 38 will lose the detection of the 24V control signal. As such, at step 60, the switch control module 38 will detect that the presence of the removable shore power source 32 has been lost. In other words, the removable shore power source 32 is no longer in electrical connection with the onboard electrical junction box 20. When the loss of the 24V control signal is detected, the control switch 42 will open the removable shore power source position 42b-42b and close the power collector device position 42a-42a. This loss of the 24V control signal will occur faster than the loss of the 750V power supply to the electrical systems 26, since pins B and H are shorter than pins G and A. As such, the control switch 42 will open the removable shore power source position 42b-42b before the power from the removable shore power source 32 has dissipated.

At step 62, the switch control module 38 detects when the electrical load being supplied to the electrical systems 26 has dissipated below a certain threshold. As mentioned above, if the electrical load is not below the certain threshold, then the auto-change-over switch 34 will be prevented from changing position for safety reasons. This is represented by box 64 of FIG. 6.

However, after the removable shore power source 32 has been removed for a certain amount of time, the power within the onboard electrical junction box will have dissipated and the load sensor module 40, which as described herein is a current sensor module 41, will detect that the current being supplied to the electrical systems 26 is below a certain threshold. When the current sensor module 41 detects that the current being supplied to the electrical systems 26 is below a certain threshold (such as less than 1 A), then it moves from the normally open position (NO) to the closed position (NC). When the current sensor module 41 is in the closed position, a signal is able to pass to the switch control module 38, such that the switch control module 38 is able to detect that the load on the electrical systems 26 is below the certain threshold.

However, when the current sensor module 41 is in the open position, it means that a load is being applied to the electrical systems 26, and no signal from the current sensor module 41 is received at the switch control module 38. In the absence of such a signal, the switch control module 38 is prevented from causing the auto-change-over switch 34 from changing position. This is represented by box 64 in FIG. 6.

Figure 6:
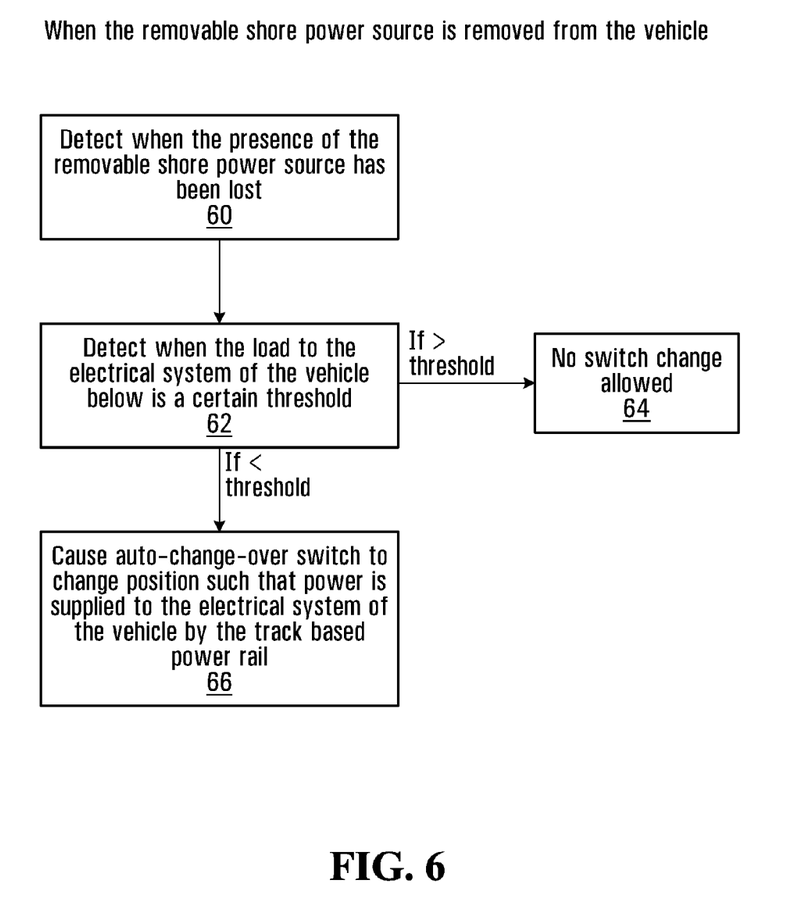
FIG. 6 shows a second non-limiting flow diagram of an operation performed by the switch control module according to the present invention.

Although in FIG. 6 step 60 is shown prior to step 62, it should be appreciated that these two steps could have been shown in the reverse order, with step 62 shown prior to step 60. For example, if a shut off switch for the 750 VDC circuit is included within the circuitry of the removable shore power source 32, then it is possible that a user could cut the power to the electrical systems 26 while the removable shore power source 32 is still connected to the onboard electrical junction box 20. In that manner, it is possible that the switch control module 38 would detect that the load to the vehicle's electrical systems 26 is less than the certain threshold, prior to losing the 24V control signal that informs the switch control module 38 that the removable shore power source 32 is still connected.

Regardless of the order, once the switch control module 38 has detected that the electrical load to the vehicle's electrical systems 26 is below a certain threshold and that the removable shore power source 32 is no longer connected to the onboard electrical junction box 20, at step 66 shown in FIG. 6, the switch control module 38 causes the auto-change-over switch 34 to change position back to the first state, such that power is able to be supplied to the electrical systems 26 of the railway vehicle 24 by a power rail 12 via the onboard power collector device 36. When the auto-change-over switch 34 has switched back to the first state, the three poles 1I-2I, 3I-4I and 5I-6I are closed so that power can flow from the onboard power collector device 36 to the electrical systems 26 of the railway vehicle 24. Furthermore, the three poles 1II-2II, 3II-4II and 5II-6II are open so that no power from the removable shore power source 32 can get through to the electrical systems 26.

No Power Operation

In the case where it is desired to work on the railway vehicle 24 with no power, the control switch 42 shown in FIG. 4 can be locked in the 0 position, such that power is unable to be supplied to the vehicle's electrical systems 26 either by the power rail 12 via the onboard power collector devices 36 or by the removable shore power source 32.

More specifically, when the control switch 42 is locked in the 0 position, the poles 1I-2I, 3I-4I and 5I-6I, and the poles 1II-2II, 3II-4II and 5II-6II of the auto-change-over switch 34 are all in the open position such that no power is able to be supplied to the vehicle's electrical systems 26.

Physical Characteristics of the Onboard Electrical Junction Box 20

Referring back to FIG. 2, the onboard electrical junction box 20 is generally in the shape of a rectangular box that can be mounted to the railway vehicle 24. However, it should be understood that the onboard electrical junction box 20 can be of any shape and configuration without departing from the present invention.

As described above, in accordance with the present invention, the electrical switches contained within the onboard electrical junction box 20 are solid state switches, which are lighter, less expensive and more reliable than traditional electro-mechanical switches. Accordingly, the onboard electrical junction box 20 of the present invention is relatively light compared with existing junction boxes. In a non-limiting embodiment, a high voltage (750V) electrical junction box in accordance with the present invention may have a weight of between 40-55 kg, as compared with existing junction boxes that have a weight in the range of 120 kg. In addition, a high voltage (750V) electrical junction box in accordance with the present invention has been found to be approximately 40-50% less expensive to manufacture than existing electrical junction boxes.

Although the present invention has been described in considerable detail with reference to certain preferred embodiments thereof, variations and refinements are possible without departing from the spirit of the invention. Therefore, the scope of the invention should be limited only by the appended claims and their equivalents.

The invention claimed is:

1. An onboard electrical junction box for supplying power to an electrical system of a vehicle, comprising:
   an auto-change-over switch adapted to acquire:
   i) a first state wherein power is supplied to the electrical system from a power rail via at least one onboard power collector device; and
   ii) a second state wherein power is supplied to the electrical system from a removable shore power source, wherein during operation in the second state, the at least one onboard power collector device is isolated from the power supplied by the removable shore power source; and
   a switch control module in electrical communication with the auto-change-over switch for causing the auto-change-over switch to acquire the second state upon detection that:
   (a) the removable shore power source has established an electrical connection with the onboard electrical junction box; and
   (b) the electrical system of the vehicle is receiving power below a predetermined threshold.

2. The onboard electrical junction box as defined in claim 1, wherein the onboard electrical junction box further comprises a current sensor module for detecting current supplied to the electrical system of the vehicle, the current sensor module detecting that the electrical system of the vehicle is not receiving power when the current being supplied to the electrical system of the vehicle is below a certain threshold.

3. The onboard electrical junction box as defined in claim 2, wherein when the current sensor module detects that the current supplied to the electrical system of the vehicle is above the certain threshold, the auto-change-over switch is prevented from acquiring an alternative state.

4. The onboard electrical junction box as defined in claim 1, wherein the onboard electrical junction box is a high voltage junction box.

5. The onboard electrical junction box as defined in claim 1, wherein the switch control module comprises a spring return control switch, the spring return control switch detecting that the removable shore power source has established an electrical connection with the electrical junction box at least in part on a basis of a low voltage control signal.

6. The onboard electrical junction box as defined in claim 5, wherein both the spring return control switch and the auto-change-over switch comprise solid state switches.

7. The onboard electrical junction box as defined in claim 5, further comprising an indicator light for providing a visual indication to an operator that the switch control module has detected that the removable shore power source has established an electrical connection with the electrical junction box.

8. The onboard electrical junction box as defined in claim 7, wherein upon failure of the switch control module to detect that the removable shore power source has established an electrical connection with the electrical junction box, the spring return control switch being manually operable for causing the auto-change-over switch to acquire the second state.

9. The onboard electrical junction box as defined in claim 1, wherein the auto-change-over switch comprises a three pole motorized change-over switch.

10. The onboard electrical junction box as defined in claim 1, wherein the at least one onboard power collector device comprises at least one collector shoe.

11. The onboard electrical junction box as defined in claim 1, wherein the removable shore power source comprises at least one stinger cable located within a vehicle maintenance area.

12. A method for supplying power to an electrical system of a railway vehicle through an onboard electrical junction box, the onboard electrical junction box being capable of supplying power to the electrical system of the railway vehicle from a power rail via at least one onboard power collector device, and from a removable shore power source, the method comprising:
   detecting when:
   (1) an electrical connection between the removable shore power source and the onboard electrical junction box has been established; and
   (2) the electrical system of the vehicle is not receiving power from either the at least one onboard power collector device or the removable shore power source;
   upon detection of items (1) and (2):
   i) causing power from the removable shore power source to be supplied to the electrical system of the vehicle; and
   ii) causing the power from the removable shore power source to be isolated from the at least one onboard power collector device.

13. The method as defined in claim 12, wherein upon detection of items (1) and (2), the method comprises causing an auto-change-over switch that is part of the onboard electrical junction box to switch from a first state, wherein power is supplied to the electrical system from the power rail via the at least one onboard power collector device, to a second state wherein power is supplied to the electrical system from the removable shore power source and the at least one onboard power collector device is isolated from the power supplied by the removable shore power source.

14. The method as defined in claim 13, wherein the auto-change-over switch comprises a three pole motorized change-over switch.

15. The method as defined in claim 12, wherein detecting that the electrical system of the vehicle is not receiving power from either the at least one onboard power collector device or the removable shore power source comprises detecting when a current supplied to the electrical system of the vehicle is below a predetermined threshold.

16. The method as defined in claim 13, further comprising preventing the auto-change-over switch from acquiring an alternative state when a current supplied to the electrical system of the vehicle is above a predetermined threshold.

17. The method as defined in claim 12, wherein detecting that the removable shore power source has established an electrical connection with the electrical junction box is performed at least in part on a basis of a low voltage control signal from the removable shore power source.

18. The method as defined in claim 12, further comprising providing a visual indication to an operator indicating that the removable shore power source has established an electrical connection with the electrical junction box.

19. The method as defined in claim 12, wherein the onboard electrical junction box is a high voltage junction box.

20. A system for providing power to an electrical system of a railway vehicle, the system comprising:
at least one onboard power collector device for collecting power from a power rail; and
an onboard electrical junction box in electrical communication with the at least one onboard power collector device, the onboard electrical junction box comprising (i) an auto-change-over switch adapted to acquire: (1) a first state wherein power is supplied to the electrical system from the power rail via the at least one onboard power collector device; and (2) a second state wherein power is supplied to the electrical system from a removable shore power source, wherein during operation in the second state, the at least one onboard power collector device is isolated from the power supplied by the removable shore power source; and (ii) a switch control module in electrical communication with the auto-change-over switch for causing the auto change-over switch to acquire the second state upon detection that (a) the removable shore power source has established an electrical connection with the onboard electrical junction box; and (b) the electrical system of the vehicle is receiving power below a predetermined threshold.

* * * * *